(No Model.) 2 Sheets—Sheet 2.
E. G. THOMAS.
AUTOMATIC WEIGHING MACHINE.
No. 573,247. Patented Dec. 15, 1896.
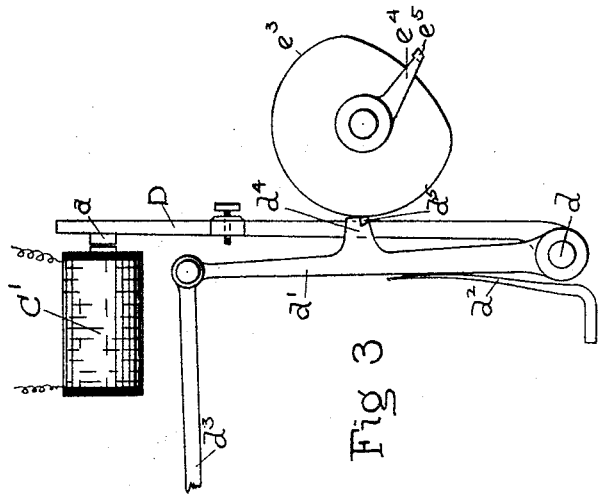
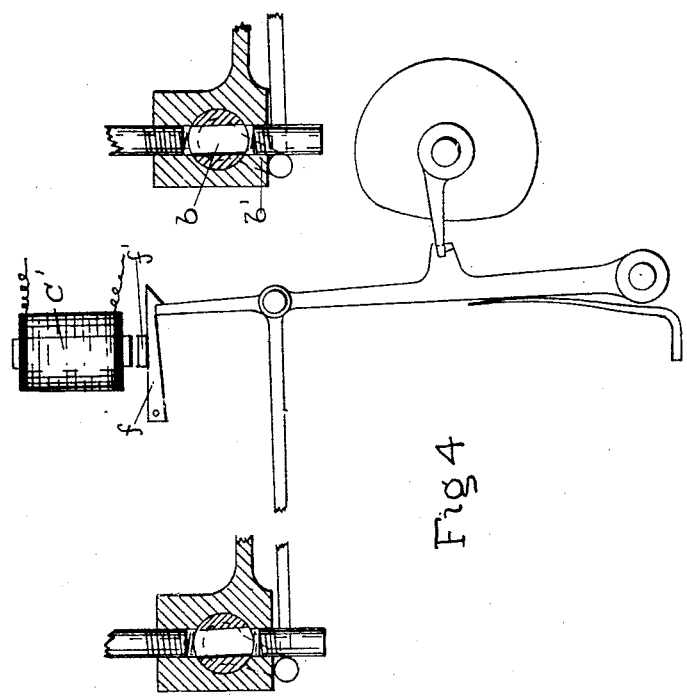
Witnesses
Winthrop E. Wood
James A. Lowell
Inventor
Edward G. Thomas

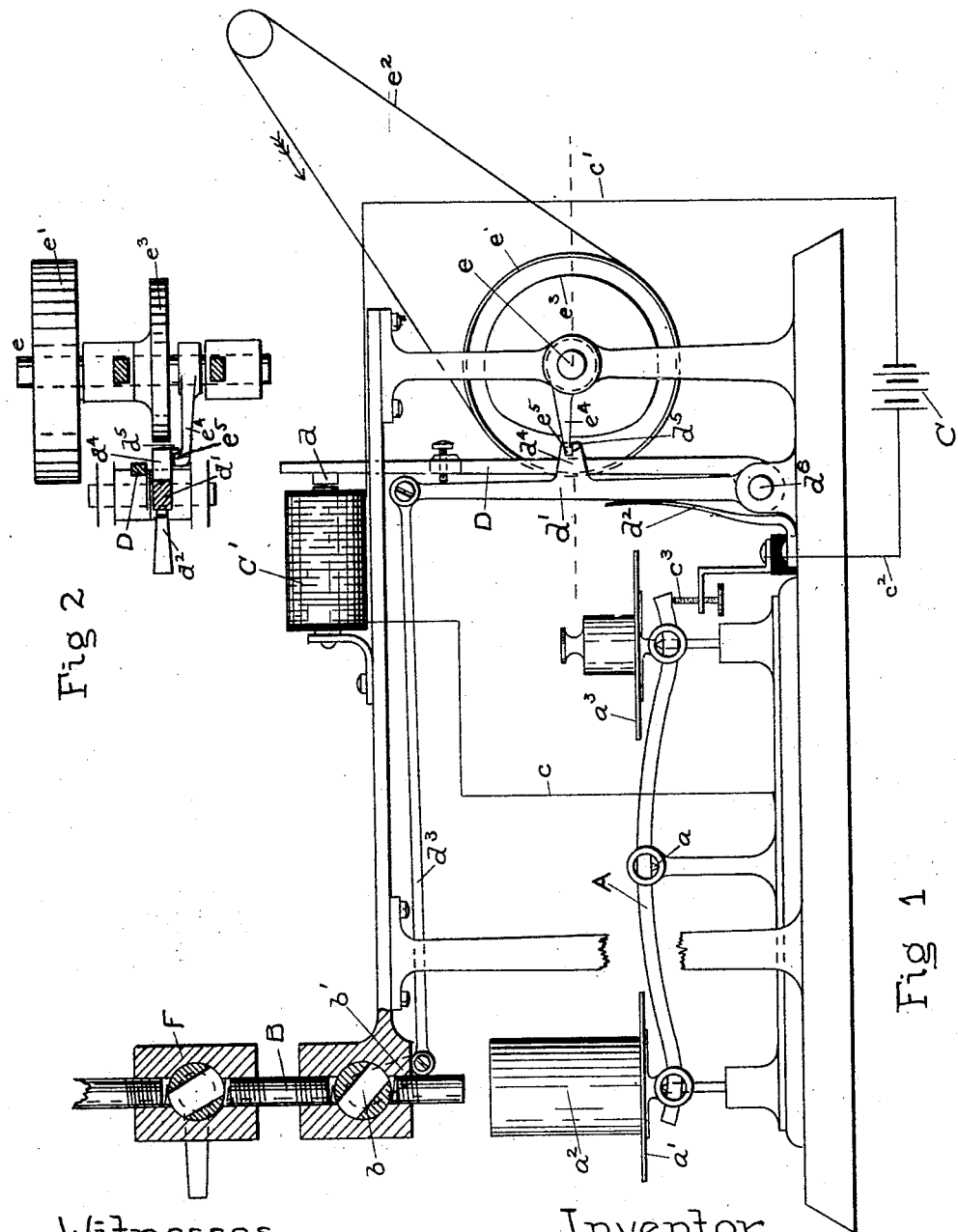

UNITED STATES PATENT OFFICE.

EDWARD G. THOMAS, OF WALTHAM, MASSACHUSETTS.

AUTOMATIC WEIGHING-MACHINE.

SPECIFICATION forming part of Letters Patent No. 573,247, dated December 15, 1896.

Application filed August 19, 1895. Serial No. 559,725. (No model.)

*To all whom it may concern:*

Be it known that I, EDWARD G. THOMAS, a citizen of the United States, residing at Waltham, in the county of Middlesex and State of Massachusetts, have invented a new and useful Improvement in Automatic Weighing Apparatus, of which the following is a full, clear, and exact description, reference being had to the accompanying drawings, forming a part of this specification, in explaining its nature.

The invention relates to an automatic weighing device having means for feeding the material to be weighed provided with an electric circuit of which a scale-beam is a part, and when a given quantity in weight of the material has been fed, the scale-beam breaks by its movement the circuit, causing the release of an actuating device normally held in a position to thus operate by a magnet which is devitalized upon the breaking of said circuit, and releases it and thereby permits the operation of the instrumentality which finally closes a valve in the material-supply pipe, or the scale-beam may act to make or close a circuit by its movement, thereby energizing a magnet which will cause an actuating device to operate, as will be more particularly described.

I will describe the invention in connection with the drawings, which are in the nature of diagrams rather than of accurate representations of the details of my invention.

Figure 1 is a view in side elevation representing one means of carrying my invention into effect. Fig. 2 is a view in horizontal section upon the dotted line of Fig. 1 and in plan of the parts below said line. Fig. 3 shows a different means of carrying my invention into effect; and Fig. 4 is a detail view, to which reference will be hereinafter made.

A represents the scale-beam of a conventional scale, which is hung at $a$ and carries at one end a scale-pan $a'$, upon which rests a receptacle $a^2$, into which the material to be weighed is adapted to be fed from a hopper or supply-pipe B, the outlet to which is controlled by a valve $b$. At the other end of the scale-beam is a scale-pan $a^3$ for supporting the weight. It will be understood that this is simply a conventional representation of a scale, and that I do not confine my invention to any special form shown. The scale forms a part of an electric circuit extending from the battery C to the magnet C'. The line $c$ connects the scale with the magnet, the line $c'$ connects the magnet with the battery, and the line $c^2$ the battery with the contact-point $c^3$, the latter beam preferably adjustable, and with which the scale-beam is in contact when the weight is upon it and until the material being weighed overbalances the weight, when the contact is broken. The magnet C' is energized until this overbalancing takes place, and it attracts and holds the armature of the lever D, which is pivoted at $d^6$, and acts either directly or through the intermediate lever $d'$ to compress and hold compressed the spring $d^2$. The lever $d'$, as represented, is connected with the arm or lever $b'$ of the regulating-valve $b$ in the pipe B by means of a long link or connection $d^3$.

It will be understood, of course, that the valve $b$ is normally closed and that to start the feeding of the material to be weighed it is necessary that it should be opened. It will also be understood that after it has been opened it will automatically close when a proper amount of material has been fed. It may be opened by hand by movement of the valve-lever $b'$ or any other suitable device, or it may be opened automatically at stated intervals. I have represented this means of actuating it, the same comprising a shaft $e$, suitably supported, having a pulley $e'$ and carrying an edge guide or cam $e^3$, the edge of which is adapted to come in contact with the projection $d^4$ from the lever $d'$. This cam $e^3$ upon its rotation, coming into contact with the projection $d^4$ upon the lever $d'$, moves the said lever $d'$ and link $d^3$, opening the valve. This movement of the lever is in opposition to the stress of the spring $d^2$. This movement of the lever $d'$ also causes the movement of the lever D to the magnet, the two levers being connected together by a spring or any other suitable yielding device.

The cam $e^3$ is so shaped as to hold the valve wide open or nearly so long enough to almost fill the receptacle $a^2$, then to partly close the valve, leaving a small hole open until the required weight of material has entered the receptacle, when the cam will allow the valve to be closed by the mechanism to be presently described.

For convenience I shall hereinafter refer to the position of the valve when wide open as the "maximum opening" and to its position when nearly closed as its "minimum opening."

The projection $d^1$ of the lever $d'$ is pressed against the cam by the spring $d^2$ through the greater part of its revolution until the lever $d'$ comes in contact with the lever D, which happens just before the closing of the valve. When the receptacle has received the desired amount of material, the weight is overbalanced and the contact between the scale-beam and the contact-point $c^3$ is broken, the magnet devitalized, and the lever D released, thereby permitting the spring to push the lever $d'$ far enough to close the valve.

In order to stop the rotation of the cam when the receptacle $a^2$ is almost full and allow the valve to be held at its minimum opening, as described, I have located a stop $d^5$ in the projection $d^4$. The stop $d^5$ is adapted to engage a stop $e^5$ on the arm $e^4$, which is fixed on the shaft $e$ at the time when the operation of weighing has been nearly completed. When the circuit is broken, as described above, the stop $d^5$ on the lever $d'$ will be pushed beyond the stop $e^5$ on the arm $e^4$, and the cam-shaft $e$ thus permitted to start again. The shape of the cam is such as to allow time to substitute an empty receptacle for the full one after the cam-shaft has been started again. (See Fig. 1.)

I prefer the use of two levers constructed as described for fine weighing or when it is desirable to partly check the flow of material into the receptacle near the end of the weighing operation.

Of course the two levers D and $d'$ may be combined into one, if desired, that is, the construction would then be as though the lever $d'$ were extended sufficiently to carry the armature, or the lever D were connected to the valve by the link $d^3$ and the spring $d^2$ were to bear directly against it.

The operation of the device is essentially as follows: The weight is placed or moved upon the scale-beam, causing the scale to be brought in contact with a contact-point $c^3$ and the circuit to be established and magnet energized. The valve in the supply-pipe is then opened by hand or automatically, and upon the feeding of a given quantity to balance or overbalance the weight the circuit is interrupted or broken by the movement of the scale-beam from the contact-point, the magnet losing its energy and permitting the spring which it has restrained to act to close the valve. If a more restrained closing is desired, then additional devices are used for the purpose of permitting a partial closing of the valve before the contact is broken and the final closing permitted. Any equivalent for the magnet C' may be used, and also any equivalent partial-releasing mechanism may be substituted for the cam.

It will be seen that the material when fed to balance the weight is the means for causing the contact to be interrupted or broken.

It will be understood that the operation of the magnet is constant and that the circuit is established to continue during the entire operation.

In Fig. 4 I have shown a different way of practicing my invention, which consists in a pawl $f$, which is adapted to engage the lever D. The pawl carries the armature $f'$. The scale-beam is so arranged as to close the circuit when the weighing operation is complete, instead of breaking it, as I have before described. When the circuit is closed, the magnet will be energized and the pawl will be moved, thereby allowing the lever to operate. I have shown these two ways of practicing my invention, but I would not be understood as limiting myself to the specific constructions shown, nor to these two methods only.

It will be understood that in place of the pipe B, I may use a hopper or any suitable means for conveying the material to be weighed to the receptacle $a^2$.

In order to vary the delivery-power of the hopper or pipe, I may make use of an adjusting-valve F or similar device to govern the maximum feed independently of the main valve.

I may say here also that I do not desire to confine myself to the use of a valve, but that I may employ any equivalent means for controlling the delivery of the material, such, for instance, as a gate or similar device.

I have described my invention as a weighing apparatus, but I wish to point out that I may use it as a means for measuring the volume of a liquid. It would be useful in this connection chiefly for measuring oil. It may be thus used in connection with a tank containing the oil or other liquid to be measured or in any other suitable way.

The word "scale" is used herein to indicate any suitable weighing device having a beam or moving part adapted to make and break an electric contact by the movement of said part.

Having thus fully described my invention, I claim and desire to secure by Letters Patent of the United States—

1. In an automatic weighing apparatus the combination of a scale, a valve controlling the delivery of material to the scale, a spring tending to close the valve, means for opening the valve by power not derived from the weight of the material delivered to the scale and an electromagnet controlling the closing of the valve, as and for the purposes described.

2. In an automatic weighing apparatus the combination of a scale, a valve or its equivalent, a spring tending to hold the valve closed, means for opening the valve actuated by a source of power extraneous to the scale, an electromagnet arranged to control the closing of the valve, and a circuit-breaker in the circuit of a magnet operated by the motion of the scale, as and for the purposes described.

3. In an automatic weighing apparatus the combination of a scale, a valve or its equivalent, a spring tending to close the valve, a shaft, means for rotating the shaft, a cam upon the shaft adapted to open the valve, a magnet or solenoid to control the closing of the valve and a circuit-closer in the circuit of a magnet, as and for the purposes described.

4. In an automatic weighing apparatus the combination of a scale, a valve, a spring tending to close the valve, a shaft means for rotating the shaft, a cam arranged to open the valve, a stop arranged to stop the turning of the shaft at a definite point in its rotation and electrical devices for controlling the closing of the valve and the release of the shaft from its stop, substantially as described.

5. In an automatic weighing apparatus the combination of a scale, a valve, means constantly tending to close the valve, means for opening the valve actuated by power not derived from the weight of the material delivered to the scale, an armature connected with the valve, an electromagnet arranged to hold the valve open when energized and a circuit-breaker arranged to open the circuit of a magnet when a predetermined amount is delivered to the scale, substantially as described.

6. In an automatic weighing apparatus the combination of a scale, an instrumentality arranged to close the valve, means for opening the valve actuated by power not derived from the weight of the material to be measured, an arresting device for preventing the entire action of the valve-closing instrumentality until a predetermined interval and arranged to engage the valve-closing mechanism after a partial closing of the valve has been effected.

7. In an automatic weighing apparatus the combination of a scale, a valve, an instrumentality for actuating the valve, actuated by power not derived from the weight of the material to be weighed, and an electrically-operated device distinct from the valve-actuating instrumentality and superimposed thereon for controlling the closing of the valve.

8. In an automatic weighing apparatus the combination of a scale, a valve not actuated by the material to be measured, an instrumentality arranged to close the valve, means for opening the valve in opposition to the valve-closing instrumentality, and for permitting said instrumentality to close the valve, and an arresting device for preventing the action of the valve-closing instrumentality until a predetermined interval, and means electrically controlled by the movement of the scale to release the said arresting device and permit the full closing of the valve.

9. In an automatic weighing apparatus the combination of a scale, a valve, an instrumentality arranged to close the valve, means for opening the valve in opposition to the valve-closing instrumentality, and for permitting said instrumentality to close the valve, an electrically-actuated arresting device for preventing the action of the valve-closing instrumentality until a predetermined interval, the said arresting device making prior contact with an energized magnet by which it is held before becoming engaged by said valve-closing instrumentality, and being released by the demagnetizing of said magnet to permit the full closing of the valve upon the movement of the scale to open an energizing-circuit.

10. In an automatic weighing apparatus the combination of a scale, a valve controlling the delivery of material to the scale, a spring tending to close the valve, means for opening the valve by power not derived from the weight of the material to be measured, an electromagnet controlling the closing of the valve and devices for automatically releasing said means for opening the valve, after the closing of said valve.

EDWARD G. THOMAS.

In presence of—
JAMES A. LOWELL,
E. L. FORD.